US008375473B2

(12) United States Patent
Celona et al.

(10) Patent No.: US 8,375,473 B2
(45) Date of Patent: Feb. 19, 2013

(54) HELMET MOUNT FOR VIEWING DEVICE

(75) Inventors: Marc J. Celona, Dover, NH (US); Gary M. Lemire, Lee, NH (US); James W. Teetzel, York, ME (US)

(73) Assignee: Wilcox Industries Corp., Newington, NH (US)

( * ) Notice: Subject to any disclaimer, the term of this patent is extended or adjusted under 35 U.S.C. 154(b) by 240 days.

(21) Appl. No.: 12/791,063

(22) Filed: Jun. 1, 2010

(65) Prior Publication Data
US 2010/0299814 A1    Dec. 2, 2010

Related U.S. Application Data

(60) Provisional application No. 61/182,957, filed on Jun. 1, 2009.

(51) Int. Cl.
*A42B 1/24* (2006.01)
(52) U.S. Cl. .......................................................... 2/422
(58) Field of Classification Search ............... 2/410, 6.1, 2/6.2, 6.3, 6.4, 6.5, 422, 425, 451; 359/409
See application file for complete search history.

(56) References Cited

U.S. PATENT DOCUMENTS

| | | | |
|---|---|---|---|
| 3,548,411 A * | 12/1970 | Barstow et al. .................... 2/6.5 |
| 4,156,292 A | 5/1979 | Helm et al. |
| 4,242,757 A | 1/1981 | Nava |
| 4,449,787 A | 5/1984 | Burbo et al. |
| 4,577,347 A | 3/1986 | Connon |
| 4,660,943 A | 4/1987 | Ellis |
| 4,689,834 A | 9/1987 | McCarthy et al. |
| 4,901,210 A | 2/1990 | Hanabusa |
| 4,987,608 A | 1/1991 | Cobb |
| 5,265,276 A | 11/1993 | Kimberly, Jr. |
| 5,331,684 A * | 7/1994 | Baril et al. ........................... 2/6.2 |
| 5,347,119 A * | 9/1994 | Connors ................... 250/214 VT |
| 5,367,402 A | 11/1994 | Holmes et al. |
| 5,408,086 A | 4/1995 | Morris et al. |
| 5,412,811 A | 5/1995 | Hildenbrand et al. |
| 5,416,922 A | 5/1995 | Horvat et al. |
| 5,467,479 A | 11/1995 | Mattes |
| 5,469,578 A * | 11/1995 | Mattes ................................ 2/6.7 |
| 5,471,678 A | 12/1995 | Dor |
| 5,506,730 A | 4/1996 | Morley et al. |
| 5,535,053 A | 7/1996 | Baril et al. |
| 5,542,627 A | 8/1996 | Crenshaw et al. |

(Continued)

FOREIGN PATENT DOCUMENTS

| | | |
|---|---|---|
| FR | 2677604 | 12/1992 |
| GB | 2470831 A | 12/2010 |

OTHER PUBLICATIONS

U.S. Appl. No. 13/019,889, filed Feb. 2, 2011.

(Continued)

*Primary Examiner* — Alissa L Hoey
(74) *Attorney, Agent, or Firm* — McLane, Graf, Raulerson & Middleton, Professional Association

(57) ABSTRACT

An improved helmet mounting device for an optical device, such as a night vision device, is provided. The mounting device herein includes sliding carriage arms and a pivot member for pivoting the viewing device up and away from the user's line of sight. In the depicted preferred embodiments, an optional reinforced mounting fastener system is provided. In another aspect, a movable sensor element may provided on the helmet mount for controlling operation of an attached vision device. In still further embodiments, a breakaway mechanism is provided which allows the user to select between a rigid attachment between the helmet and the optical device and a breakaway attachment wherein the optical device will break away from the helmet when an applied force exceeds a threshold amount of force.

14 Claims, 11 Drawing Sheets

U.S. PATENT DOCUMENTS

| | | | |
|---|---|---|---|
| 5,581,806 A | 12/1996 | Capdepuy et al. | |
| 5,703,354 A | 12/1997 | Wannagot et al. | |
| D392,071 S | 3/1998 | Berke | |
| D402,421 S | 12/1998 | Berke | |
| 5,857,599 A * | 1/1999 | Palmer | 224/181 |
| 5,898,472 A | 4/1999 | Oshikawa | |
| 5,914,816 A | 6/1999 | Soto et al. | |
| 5,920,371 A | 7/1999 | Chang et al. | |
| 6,457,179 B1 | 10/2002 | Prendergast | |
| 6,462,867 B2 | 10/2002 | Choinere | |
| 6,472,776 B1 | 10/2002 | Soto et al. | |
| 6,560,029 B1 | 5/2003 | Dobbie et al. | |
| 6,662,370 B1 | 12/2003 | Buchanan, Jr. | |
| 6,795,977 B2 | 9/2004 | Basson et al. | |
| 6,862,748 B2 * | 3/2005 | Prendergast | 2/422 |
| 6,957,449 B2 | 10/2005 | Prendergast | |
| 7,219,370 B1 | 5/2007 | Teetzel et al. | |
| 7,649,701 B2 * | 1/2010 | Prendergast et al. | 359/815 |
| 7,729,063 B2 * | 6/2010 | Willey et al. | 359/815 |
| 7,735,159 B2 | 6/2010 | Prendergast | |
| 7,810,168 B2 * | 10/2010 | Reed et al. | 2/6.2 |
| 7,996,917 B2 * | 8/2011 | Prendergast | 2/6.2 |
| 8,087,100 B2 * | 1/2012 | Aguero et al. | 2/422 |
| 8,181,269 B2 * | 5/2012 | Aguero et al. | 2/6.2 |
| 2002/0120979 A1 | 9/2002 | Prendergast | |
| 2004/0181855 A1 * | 9/2004 | Prendergast | 2/422 |
| 2005/0111097 A1 | 5/2005 | Iannarelli et al. | |
| 2006/0143764 A1 * | 7/2006 | Reed et al. | 2/6.2 |
| 2006/0174401 A1 * | 8/2006 | Prendergast | 2/422 |
| 2006/0290451 A1 * | 12/2006 | Prendergast et al. | 335/205 |
| 2007/0067894 A1 * | 3/2007 | Bourree et al. | 2/422 |
| 2007/0214551 A1 | 9/2007 | Teetzel et al. | |
| 2008/0263752 A1 | 10/2008 | Solinsky et al. | |
| 2009/0133178 A1 * | 5/2009 | Aguero et al. | 2/6.2 |
| 2009/0133179 A1 * | 5/2009 | Aguero et al. | 2/6.3 |
| 2010/0175172 A1 * | 7/2010 | Dempsey et al. | 2/422 |
| 2010/0180364 A1 * | 7/2010 | Willey et al. | 2/422 |
| 2011/0099695 A1 * | 5/2011 | Siviter | 2/422 |
| 2011/0145981 A1 * | 6/2011 | Teetzel et al. | 2/422 |
| 2011/0239354 A1 * | 10/2011 | Celona et al. | 2/422 |

OTHER PUBLICATIONS

U.S. Appl. No. 12/951,969, filed Nov. 22, 2010.
UK Search Report dated Sep. 2, 1010, UK Patent Application No. GB100917.0 filed Jun. 1, 2010.
U.S. Appl. No. 12/117,704, filed May 8, 2008.
U.S. Appl. No. 12/259,010, filed Oct. 27, 2010.
U.S. Appl. No. 12/759,435, filed Apr. 13, 2010.

* cited by examiner

HELMET MOUNT FOR VIEWING DEVICE

CROSS REFERENCE TO RELATED APPLICATION

This application claims priority under 35 U.S.C. §119(e) to U.S. provisional patent application Ser. No. 61/182,957 filed Jun. 1, 2009. The aforementioned provisional application is incorporated herein by reference in its entirety.

INCORPORATION BY REFERENCE

Each of the aforementioned U.S. patents and patent applications is incorporated herein by reference in its entirety: Ser. No. 61/168,789 filed Apr. 13, 2009; Ser. No. 12/259,010 filed Oct. 27, 2008; Ser. No. 60/982,533 filed Oct. 27, 2007; Ser. No. 12/117,704 filed May 8, 2008; Ser. No. 60/928,239 filed May 8, 2007; Ser. No. 11/804,813 filed May 21, 2007; Ser. No. 10/959,906 filed Oct. 6, 2004; U.S. Pat. No. 7,219,370 issued May 22, 2007; Ser. No. 60/509,136 filed Oct. 6, 2003; and Ser. No. 12/759,435 filed Apr. 13, 2010.

BACKGROUND

The present disclosure relates to an improved system for mounting an optical device to headgear such as a field helmet, and specifically, a mount with a pivot axis for flipping an attached optical device to a flipped or stowed position, which is elevated out of the user's line of sight when the optical device is not in use. The optical device may be, without limitation, a night vision device enabling viewing under nighttime or other low light conditions, such as night vision goggles (NVG) or electronic night vision goggles (eNVG), night vision binocular devices, night vision monocular devices, etc., with or without magnification.

SUMMARY

A mounting apparatus for mounting an optical device on a helmet includes a helmet interface assembly removably attachable to the helmet and generally vertically slidable relative to the helmet. A pair of arms extends generally horizontally from the helmet interface assembly, each of the arms having a proximal end slidably attached to the helmet interface assembly and a distal end opposite the proximal end. A carriage member is attached to the distal end of the pair of arms and movable alternately toward and away from the helmet interface assembly by sliding movement of the arms relative to the helmet interface assembly. A pivot arm assembly is attached in hinged relation to the carriage member, the pivot arm assembly and the carriage member articulated about a generally horizontal axis which extends generally transversely relative to a user. The pivot arm assembly is pivotable between a first, operable position and a second, stowed position, wherein an attached optical device will be positioned before the eyes of a user when the pivot arm assembly is in the first position and out of a line of sight of the user when the pivot arm assembly is in the second position. An optical device mounting member is attached to the pivot arm assembly for removable attachment to an optical device.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Figure 1:
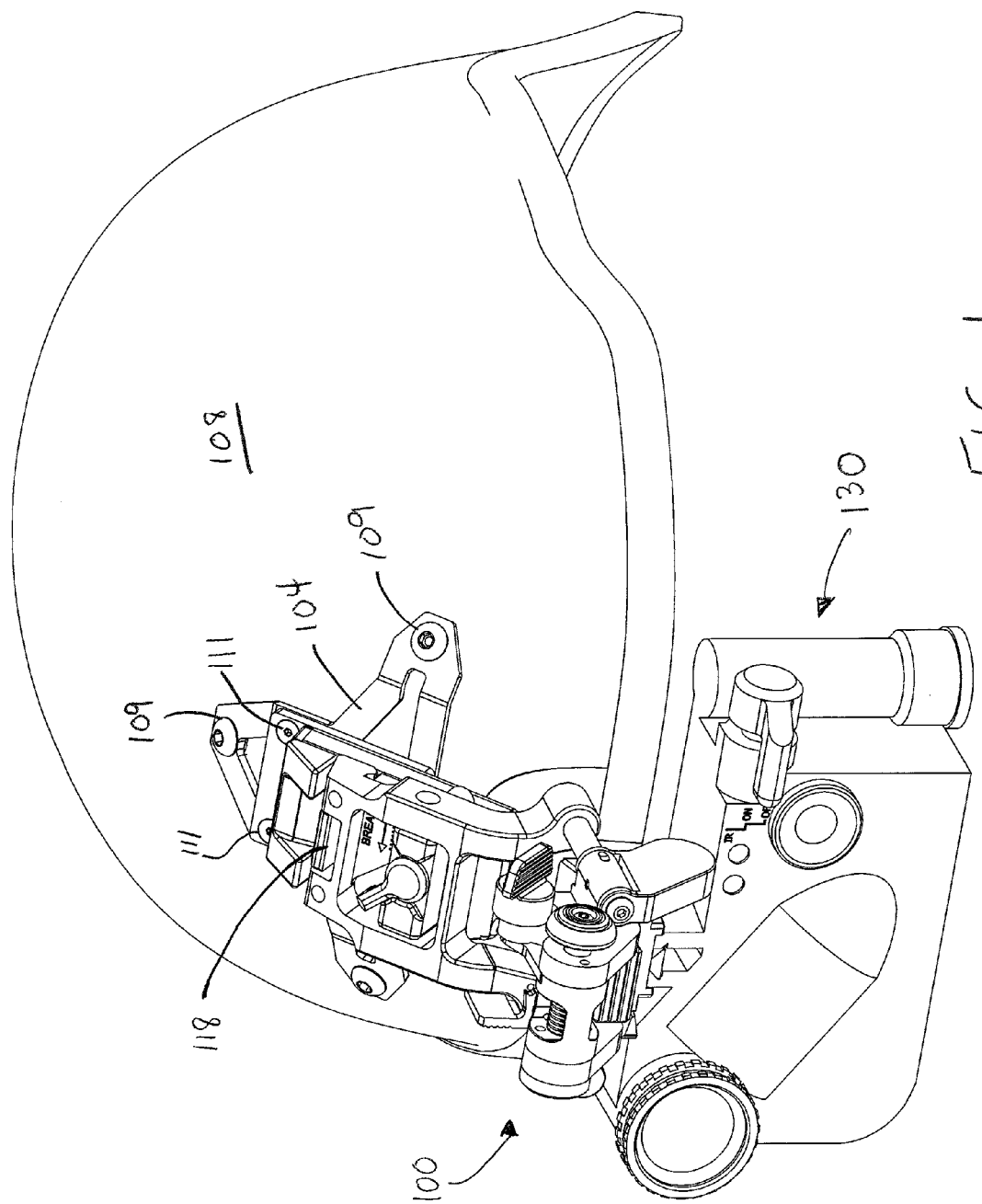
FIG. 1 is an isometric view taken generally from the front and right side of an associated helmet carrying an associated optical device using a helmet mount system according to a first exemplary embodiment, wherein the optical device is in the deployed position.

Referring now to the drawings, wherein like reference numerals refer to like or analogous components throughout the several views, with specific reference to FIGS. 1-6, there appears an exemplary helmet mounting system embodiment 100, which includes a bracket 104 attached to the front portion of a helmet 108. The exemplary bracket 104 is secured to the front of the helmet 108, e.g., via a plurality of threaded fasteners 109. It will be recognized that the illustrated mounting bracket is exemplary only and other mounting brackets may be employed as well, including the flush-mount, bayonet mounting bracket as described in the aforementioned U.S. provisional application Ser. No. 60/928,239 filed May 8, 2007, or the strap mounted bracket or the track mounted bracket shown in the aforementioned U.S. Pat. No. 7,219,370.

A breakaway base 112 is secured to the mounting bracket 104. The breakaway base 112 includes a sliding plate 114 which slides vertically with respect to an interface plate 110 engaging the bracket 104, e.g., via threaded fasteners 111. Alternatively, a removable attachment mechanism may be employed, such as a bayonet-type mount, for example, a bayonet mount in which a male bayonet mount member on the breakaway base engages a complimentary bayonet plate on the bracket 104 as described in the aforementioned U.S. application Ser. No. 12/259,010.

A depressible button 118 allows the sliding plate 114 to slide with respect to the interface plate 110 to provide a vertical adjustment of an attached optical device relative to the eyes of the user. The vertical adjustment mechanism may be of the gear rack/gear tooth type described in the aforementioned U.S. Pat. No. 7,219,370.

A breakaway cover piece 132 is secured to the breakaway base 112 in breakaway fashion. The breakaway mechanism may allow selective securing of the cover piece 132 in either breakaway or non-breakaway fashion as described in the aforementioned commonly owned U.S. Pat. No. 7,219,370, incorporated herein by reference and as described in greater detail below.

First and second carriage arms 140, 141 are slidingly received in apertures 136, 137, respectively, in the breakaway cover 132 and extend in a direction generally parallel to the line of sight of the user. The proximal end of the carriage arm 140 is received in one of the openings 136 and retained therein with a threaded fastener 144 having an enlarged diameter head portion to prevent the arm 140 from sliding all the way out of the opening 136. The distal end of the carriage arm 141 is received in the other opening 137 and retained therein with a threaded fastener 145 having an enlarged diameter head portion to prevent sliding removal of the arm 141 from the opening 137.

A transverse carriage member 152 includes a first opening 153 receiving the distal end of the carriage arm 140. A threaded fastener 143 is received within an opening 142 in the distal end of the arm 140. The transverse carriage member 152 also includes a second opening 154 receiving the distal end of the carriage arm 141. The carriage arm 141 is secured within the opening 154 by a pin 155 received through an opening 156 in the transverse carriage member 152 and an opening 165 in the arm 141. The carriage arm 140 is secured within the opening 153 by a threaded fastener engaging an opening 142 in the distal end of the arm 140 and a pin 156 extending through an opening 157 in the transverse carriage member 152 and an opening 164 in the carriage arm 140.

The transverse carriage member 152 includes a hinge piece 180 including openings 184 defining a pivot axis for receiving a pivot pin 172. The hinge piece 180 includes a cavity or opening for receiving a spring member 188, which is coaxially received about the hinge pin 172. The hinge member 180 is secured to the transverse carriage member 152 via a pin 228 passing through openings 232 in the carriage member 152 and an opening 236 in the hinge piece 180. A pin 161 extends through an opening 160 in the carriage member 152 and a corresponding aligned opening in the pin 228.

The night vision device 130 is removably attached to a pivot arm 168, which includes a pair of hinge arms 169, 170 and openings 176, 177 aligned with the openings 184 for receiving the hinge pin 172. A button 200 is secured to a first end of the hinge pin 172 via a threaded fastener 208, which passes through an opening 202 in the button 200 and engages an opening 212 in the hinge pin first end.

A retention disk 216 is secured to the opposite end of the hinge pin 172 via a threaded fastener 220. Transverse locating pins 224 are secured within openings 217 in the end piece 216 and are slidably received within openings 218 in the hinge arm 169 when the pivot arm 168 is in the deployed position. A spring pin 192 is secured within an opening 196 in the hinge pin 172 and engages the spring 188.

In operation, when it is desired to move the goggles 130 from the deployed position to the stowed position, the button 200 is depressed and the pins 224 slidably disengage from the openings 218, allowing the pivot member 168 to be pivoted to the stowed position. The spring pin 192 compresses the spring 188 when the button is depressed. When the goggles are returned to the deployed position, the bias of the spring 188 urges the button the locked position.

A cam tilt adjustment member 240 includes a cam bearing surface 244 and an off-axis member 248, which is off center with respect to the cam bearing surface 244. The cam bearing surface is received within an opening 251 on the transverse carriage member 152 and the off-axis protrusion 248 is received within an opening 252 on the hinge member 180. As the knob 240 is manually rotated, the cam surface 244 rotates in the opening 251 and the movement of the off-axis member 248 causes a pivoting movement of the hinge member 180 relative to the transverse carriage member 152. In this manner, the rotation of the knob 240 allows the user to rotate the optical axis of the night vision device 130 to a desired alignment, e.g., into alignment with the optical axis of the viewer's eye.

Fore and aft positioning of the viewing device 130 is controlled by a manually rotatable locking/unlocking lever 148 having a pair of aligned openings 151, which slidingly receive the carriage arm 141 on opposite sides of the opening 137. A pin 149 is received within an opening 150 in the cover piece 132 and runs along a bearing or cam surface 154 of the lever 148 as the lever 148 is rotated. A protrusion 153 on the lever 148 engages the pin 149 to act as a stop limiting the degree of rotation of the lever, the stop 153 abutting the pin 149 when the lever 148 is in the closed or locked position.

The cam or eccentric profile of the bearing edge 154 is such that the openings 151 are urged to an off center position relative to the arm 141 by the pin 149, thus creating tension to secure the carriage arm 141 at a desired position within the opening 137. When the lever 148 is rotated to the open or unlocked position, the cam profile 154 allows the openings to align with the arm 141, thus releasing the tension and allowing the carriage arms 140, 141 to slide freely with respect to the openings 136, 137. The fore/aft position of the vision device 130 may thus be moved to a desired focal distance in front of the eyes of the user, and is infinitely adjustable within the range of travel. When the lever 148 is rotated to the locked position, the arm 141 is again secured at a fixed position within the opening 137.

Figure 2:
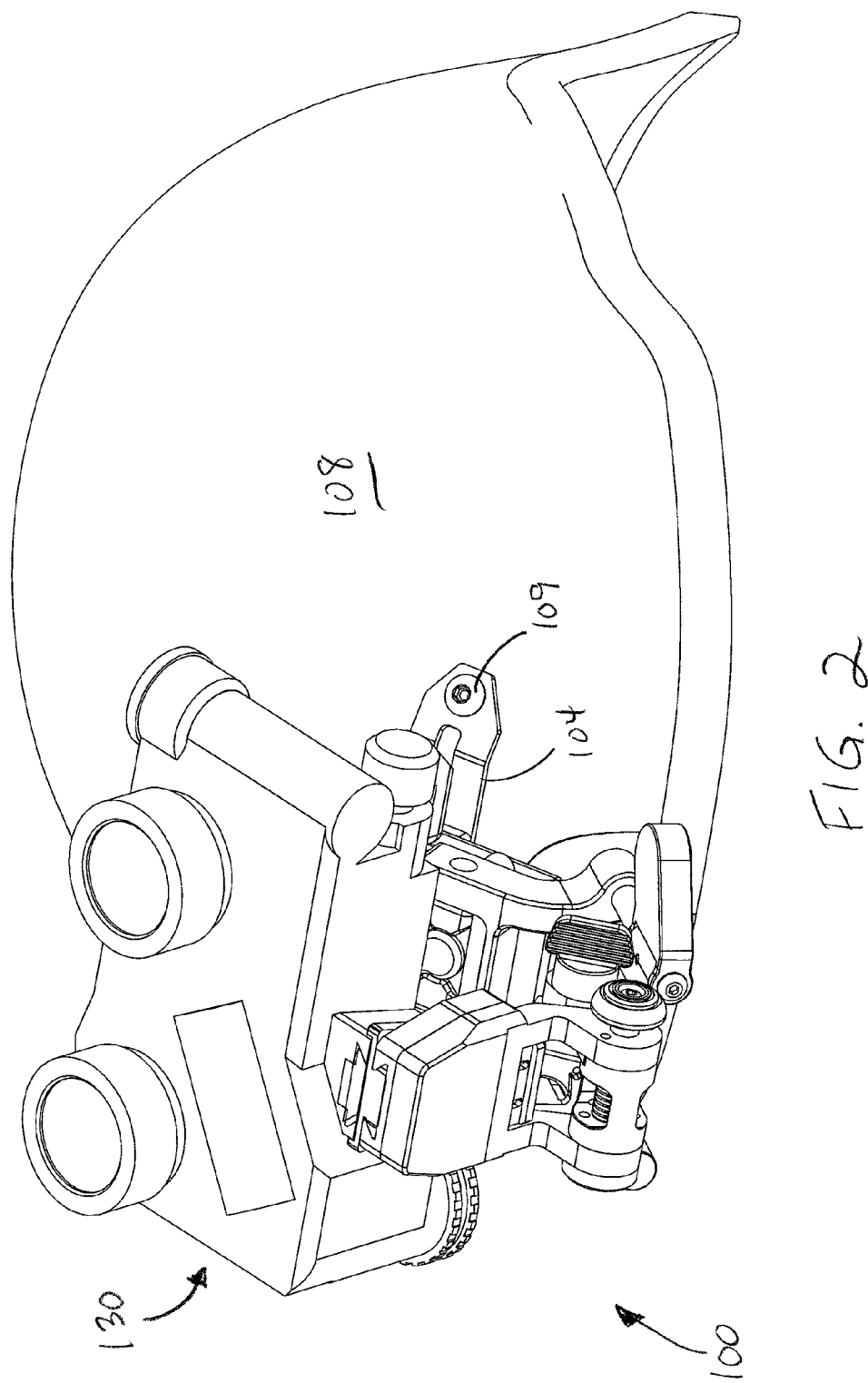
FIG. 2 is an isometric view of the embodiment appearing in FIG. 1, wherein the optical device is pivoted about the pivot axis to a stowed position.
Figure 3:
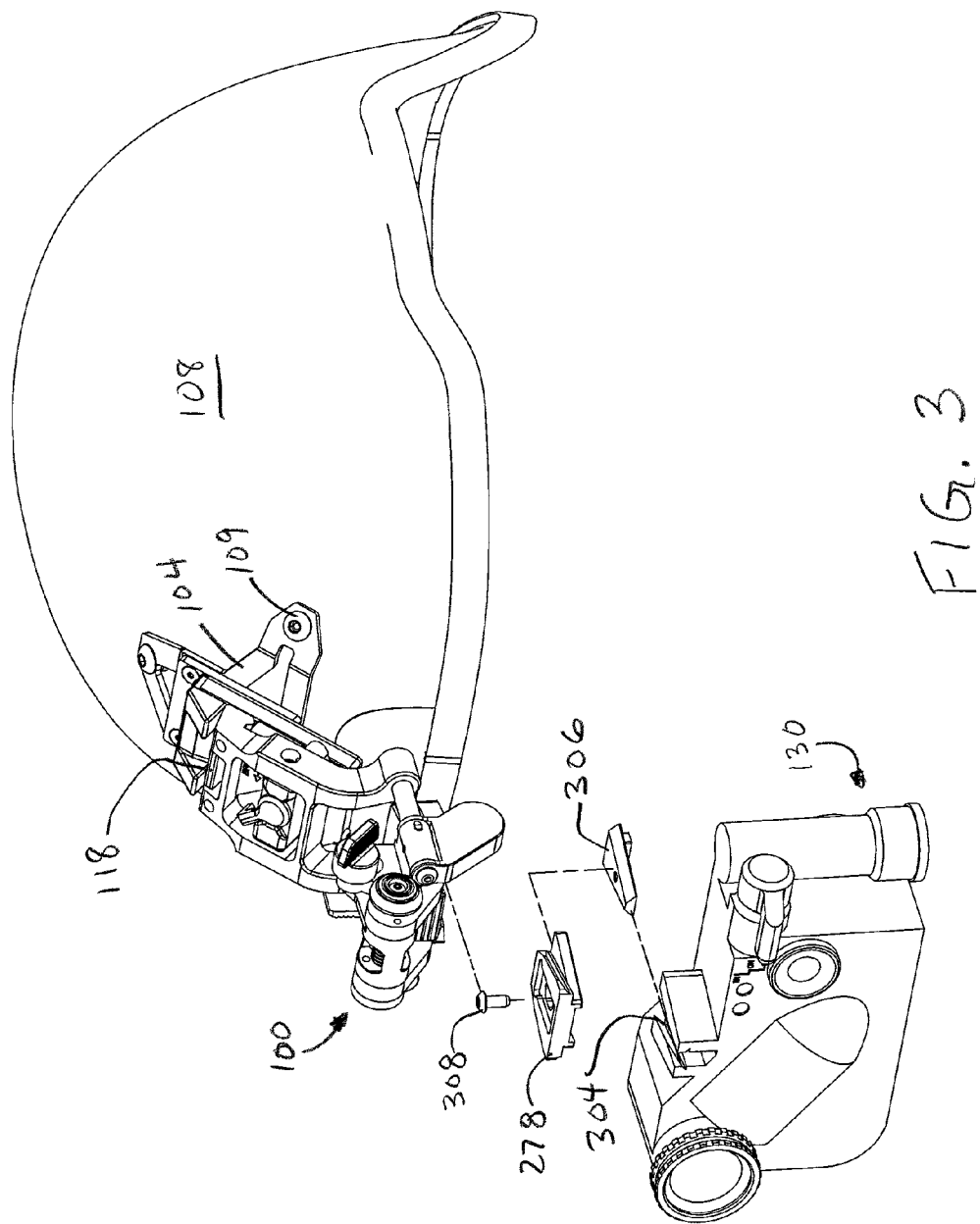
FIG. 3 is a partially exploded isometric view of the embodiment appearing in FIG. 1, illustrating a reinforced mounting mechanism in accordance with the depicted preferred embodiment.
Figure 4:
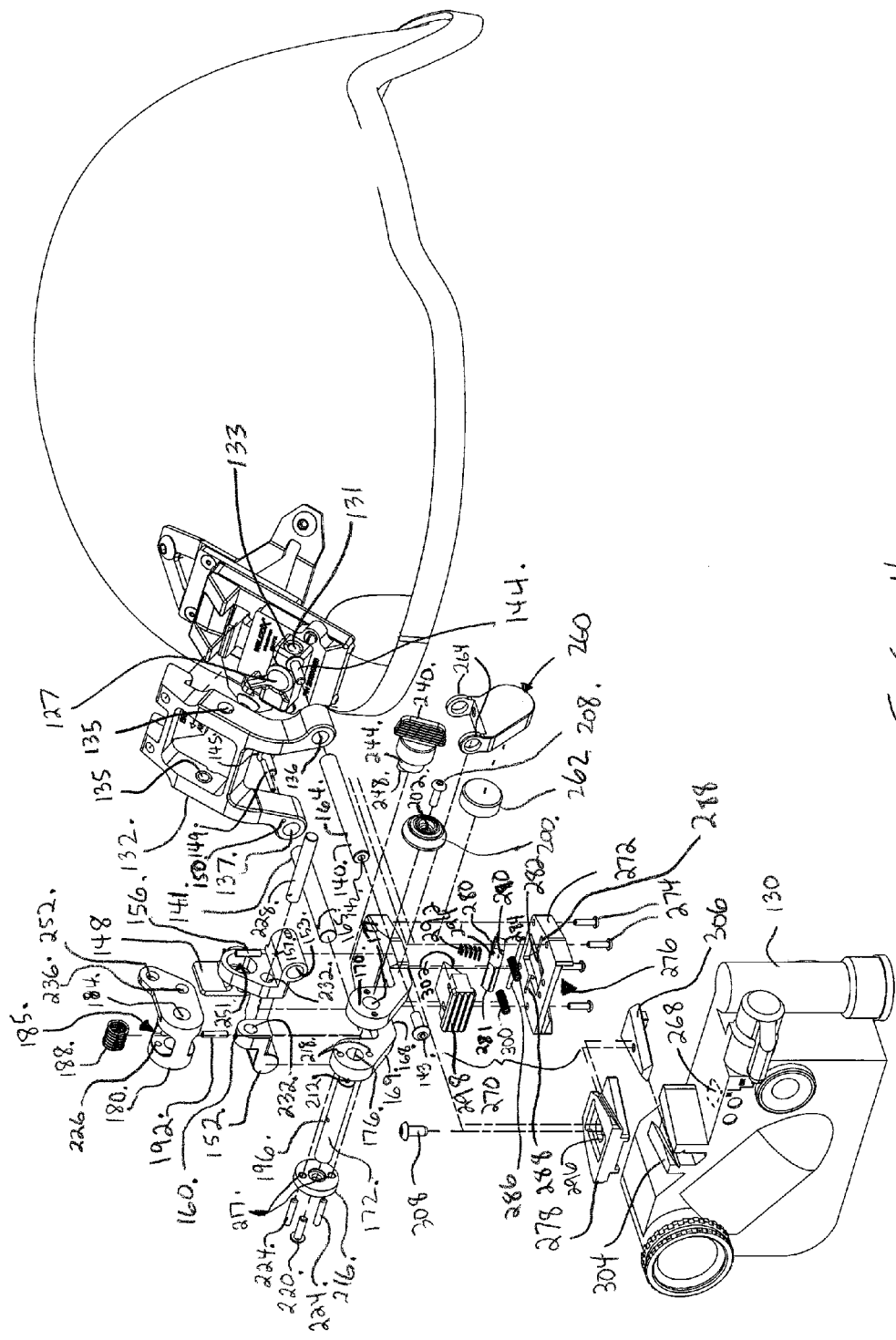
FIG. 4 is an exploded, isometric view of the helmet mounting assembly appearing in FIG. 1.
Figure 5:
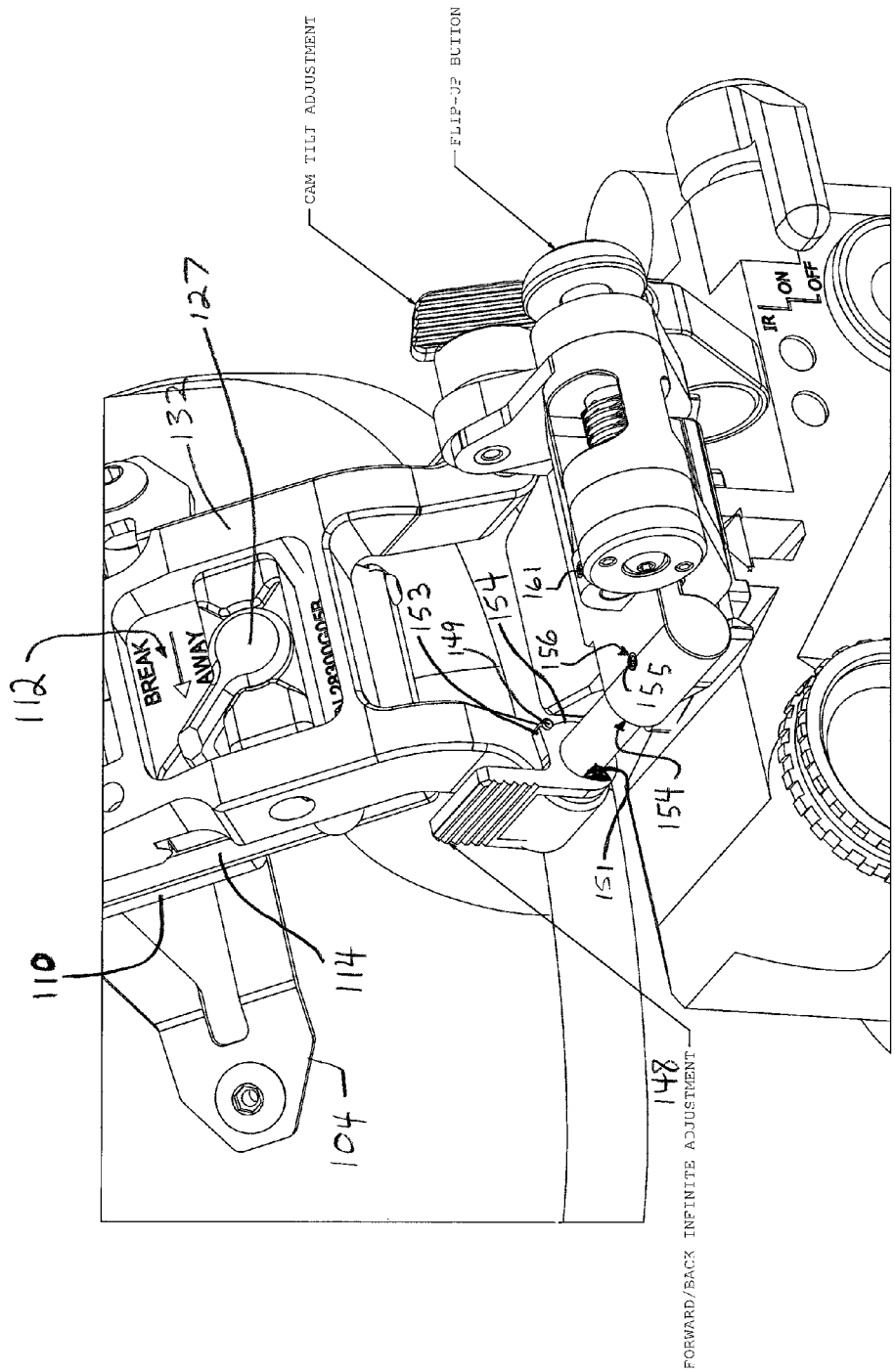
FIG. 5 is an enlarged, fragmentary, isometric view of the helmet mount system of FIG. 1 in the deployed position, taken generally from the front and left side.
Figure 6:
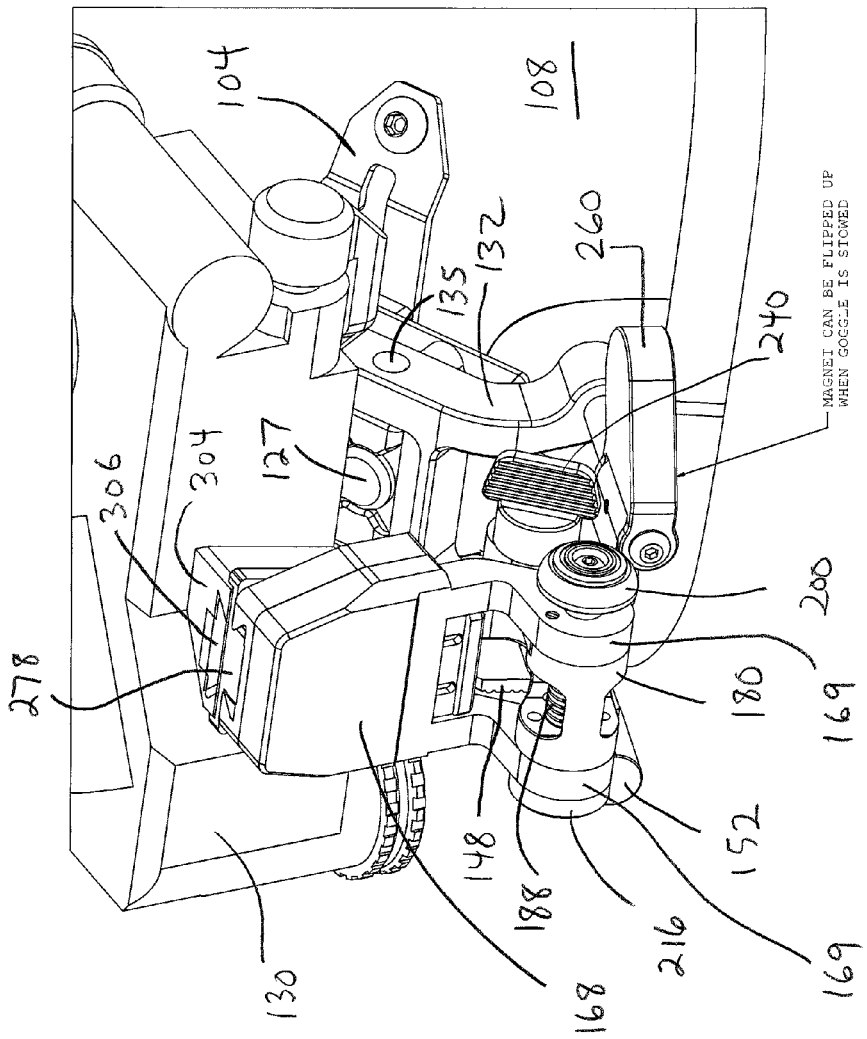
FIG. 6 is an enlarged, fragmentary, isometric view of the helmet mount system of FIG. 1 in the stowed position, taken generally from the front and right side.
Figure 7:
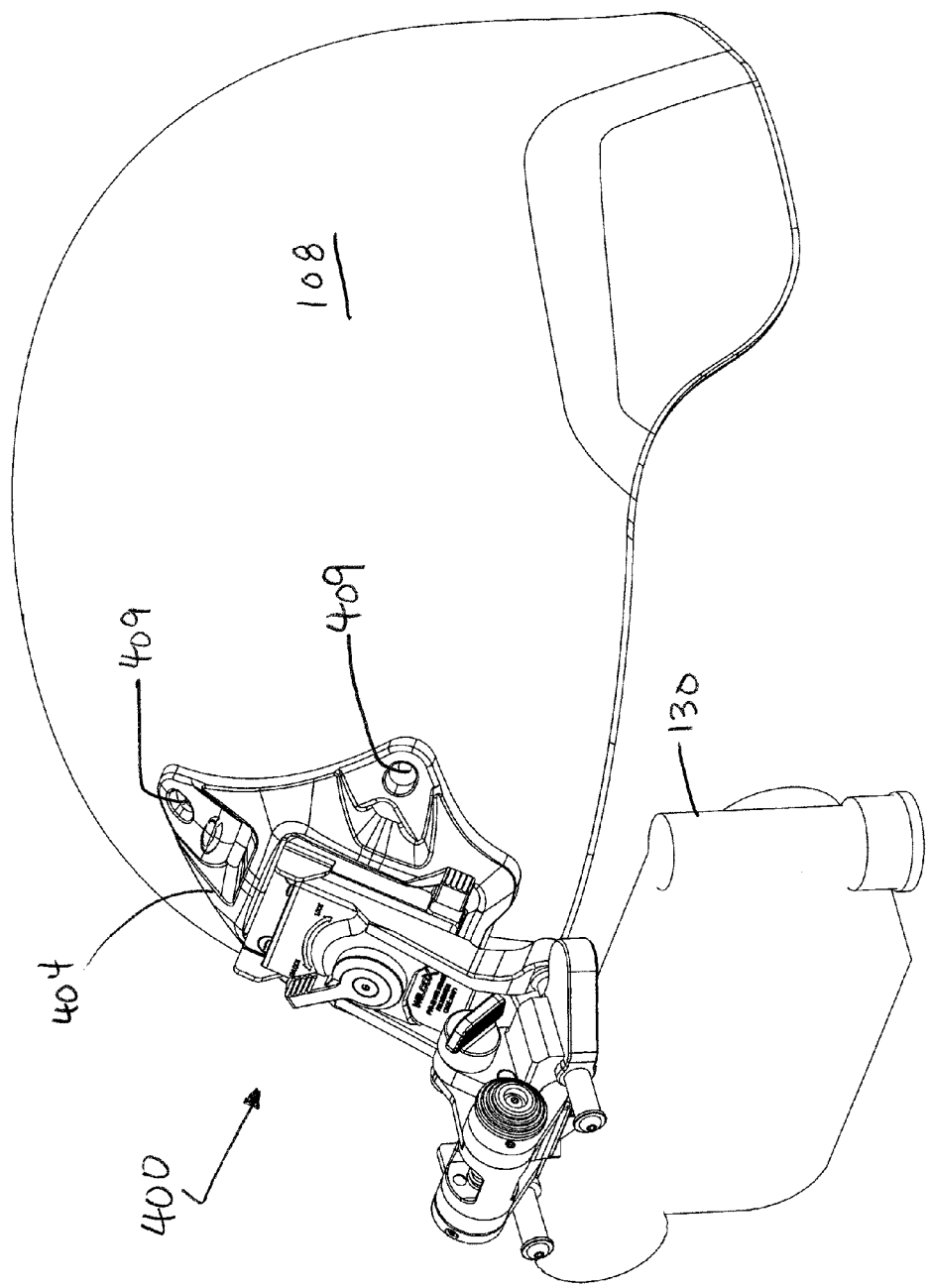
FIG. 7 is an isometric view of an associated helmet carrying an associated optical device using a helmet mount system according to a second exemplary embodiment, wherein the optical device is in the deployed position.
Figure 8:
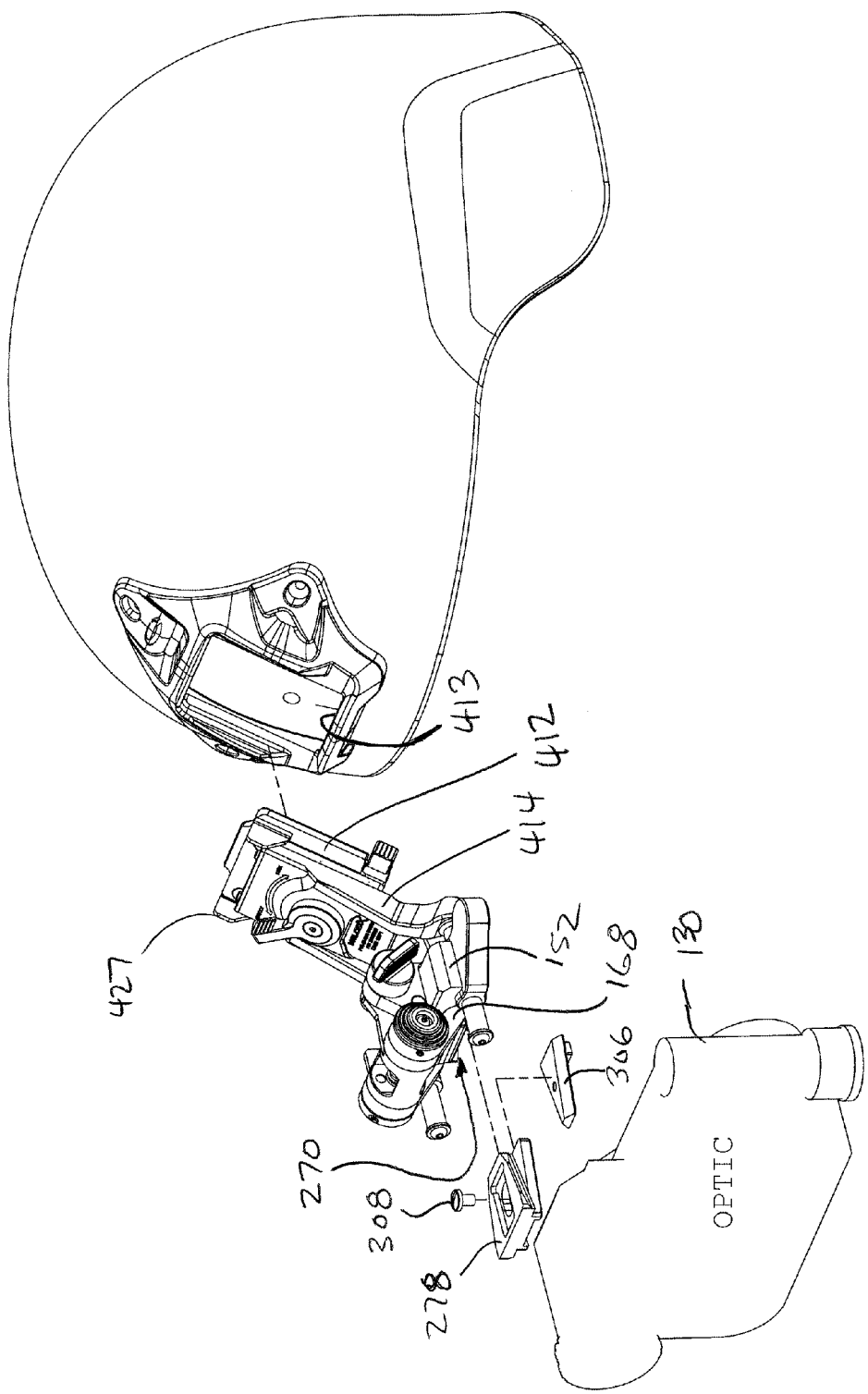
FIG. 8 is a partially exploded isometric view of the embodiment appearing in FIG. 7.

In the depicted preferred embodiment, an optional pivoting member 260 includes a pair of openings 264 receiving the arm 140 and is pivotable between a downward position (see FIG. 1) and an upward position (see FIG. 2). The pivoting member carries a sensor element 262, which is moved into proximity with a sensor 268 on the viewing device 130 when the member 260 is pivoted down and moved out of proximity with the sensor 268 when the member 260 is pivoted up. In the depicted preferred embodiment, the sensor element 262 is a magnet and the sensor 268 may be a sensor integral with the night vision device 130 that detects or changes state in the presence or absence of the magnet, such as a reed switch, Hall Effect sensor, etc., and which can control a function of the viewing device 130, based thereon. For example, the viewing device 130 may be configured to automatically power on the viewing device when the sensor element 262 is moved into proximity with the sensor 268 and to automatically power off the viewing device when the sensor element 262 is moved out of proximity with the sensor 268.

As best seen in FIG. 2, when the attached optical device 130 is not in use, the device 130 may be moved to a the stowed position by pivoting the pivoting member 168 to the upward position, thereby elevating the optical device 130 above the line of sight of the user. In this manner, the optical device 130 may be selectively moved between the viewing position and a stowed position with a single action. The member 260 may be pivoted to the upward position when the goggle is stowed (see FIG. 6).

The optical device 130 may advantageously be a Lucie night vision device available from Thales Angénieux SA, of Saint-Héand, France. It will be recognized, however, that the present invention may be adapted for use with all manner of night vision or other optical devices, including those with varying profiles or dimensions.

In the illustrated exemplary embodiment, the breakaway mechanism includes a breakaway lever 127, which is pivotable between a first, breakaway position and a second, non-breakaway position. When the breakaway lever 127 is in the breakaway position, the engagement between the breakaway base 112 and the breakaway cover 132 is removably detachable. That is, the breakaway cover 132 will detach from the breakaway base 112 upon the application of a predetermined force. When the lever 127 is moved to the non-breakaway position, the breakaway cover 132 is rigidly attached to the breakaway base 112. The breakaway mechanism may be as described in the aforementioned U.S. Pat. No. 7,219,370.

In an exemplary embodiment, when the breakaway lever 127 is in the first, breakaway position, protrusions 131 (e.g., which may be ball bearings) captured within and extending through openings in a breakaway housing 133 on the breakaway base 112 are resiliently urged into aligned and complimentary openings or depressions 135 on the breakaway cover 132. The resilient urging of the members 131 is caused by spring members (not shown) within the housing 133 and allows the breakaway cover 132 to become detached from the breakaway base 112 upon the application of a predetermined force. When the lever 127 is moved to the nonbreakaway position, a cam surface (not shown) on the lever 127 compresses the internal spring members to compress and stack the spring coils and maintain the members 131 nonresiliently in the openings 135.

In addition to the safety benefit of having a breakaway connection between the breakaway cover 132 and the breakaway base 112, the breakaway connection also provides a quick connect/disconnect mechanism for removing the optical device 130 from the helmet 108. It will be recognized, however, that in alternative embodiments (not shown), the breakaway mechanism may be omitted. For example, in certain embodiments, the sliding plate member 114 may be adapted to carry the carriage arm 140, 141 and the interface plate 110 may be adapted for a direct connection to the helmet or an interface member on the helmet, preferably via a bayonet-type connection as described above or other quick connect/disconnect mechanism.

The pivoting member 168 also includes an optical device mounting shoe assembly 270, which includes a mounting shoe 272. The mounting shoe 272 is attached to the pivot member 168 via threaded fasteners 274. The mounting shoe 272 includes a dovetail or like receptacle 276 for removably receiving a complimentary mating mounting foot member 278 of the optical device 130. A retention member 280 is received within an opening 282 in the mounting shoe 272.

The retention member 280 includes a forward end 281 and a rearward end 284. A pivot pin 286 is received within channels or grooves 288 on the mounting shoe 272 and extends transversely across the aperture 282 in the mounting shoe 272. The retention member 280 includes a groove 290 receiving the pin 286 to pivotally secure the retention member 280 in the opening 282.

A spring 292 includes a first end received within an opening 294 in the rearward end 284 of the retention member 280. A second end of the spring 292 bears against the pivoting member 168. In operation, the spring 292 urges the rearward end 284 into a complimentary depression or opening 296 on the mounting foot 278. A release button 298 is slidably received between the mounting shoe 278 and the pivoting member 168. A pair of springs 300 urges the button 298 to the locked position.

In operation, to remove the optical device 130 from the mounting shoe assembly 270, the button 298 is manually pressed inwardly. A ramped or inclined surface 302 slidingly engages the forward surface 281 of the retention member 280, urging it downward as the button 298 is depressed inward. As the retention member 280 pivots about the pin 286, the rearward end 284 moves upward against the bias of the spring 292, thereby disengaging the complimentary receptacle 296 on the mounting foot 278, allowing the optical unit 130 to be removed.

In the depicted preferred embodiment, the optical device 130 has an integral mounting shoe 304, which receives a complimentary reinforcement foot 306. The mounting foot 278 and the reinforcement foot 306 are rigidly secured to the integral shoe 304 of the optical device 130 via a threaded fastener 308. The reinforcement foot 306 and mounting foot 278 may be formed of a plastic material, or more preferably, a metal or metal alloy for greater strength. It will be recognized, however, that the reinforcement foot 306 and mounting foot 278 could be omitted and that the mounting shoe assembly 270 could be adapted to attach directly to an attachment member 304 that is integral to the device 130.

Referring now to FIGS. 7-11, there appears a second exemplary embodiment helmet mounting system 400, which includes a bracket 404 attached to the front portion of a helmet 108. The exemplary bracket 404 is secured to the front of the helmet 108, e.g., via a plurality of threaded fasteners 409. Again, the illustrated mounting bracket is exemplary only and other mounting brackets are also contemplated as described above.

A breakaway base 412 is secured to the mounting bracket 404. The breakaway base 412 includes a sliding plate 414 which slides vertically with respect to an interface plate 410 engaging the breakaway base 412, e.g., via threaded fasteners 411.

Figure 9:
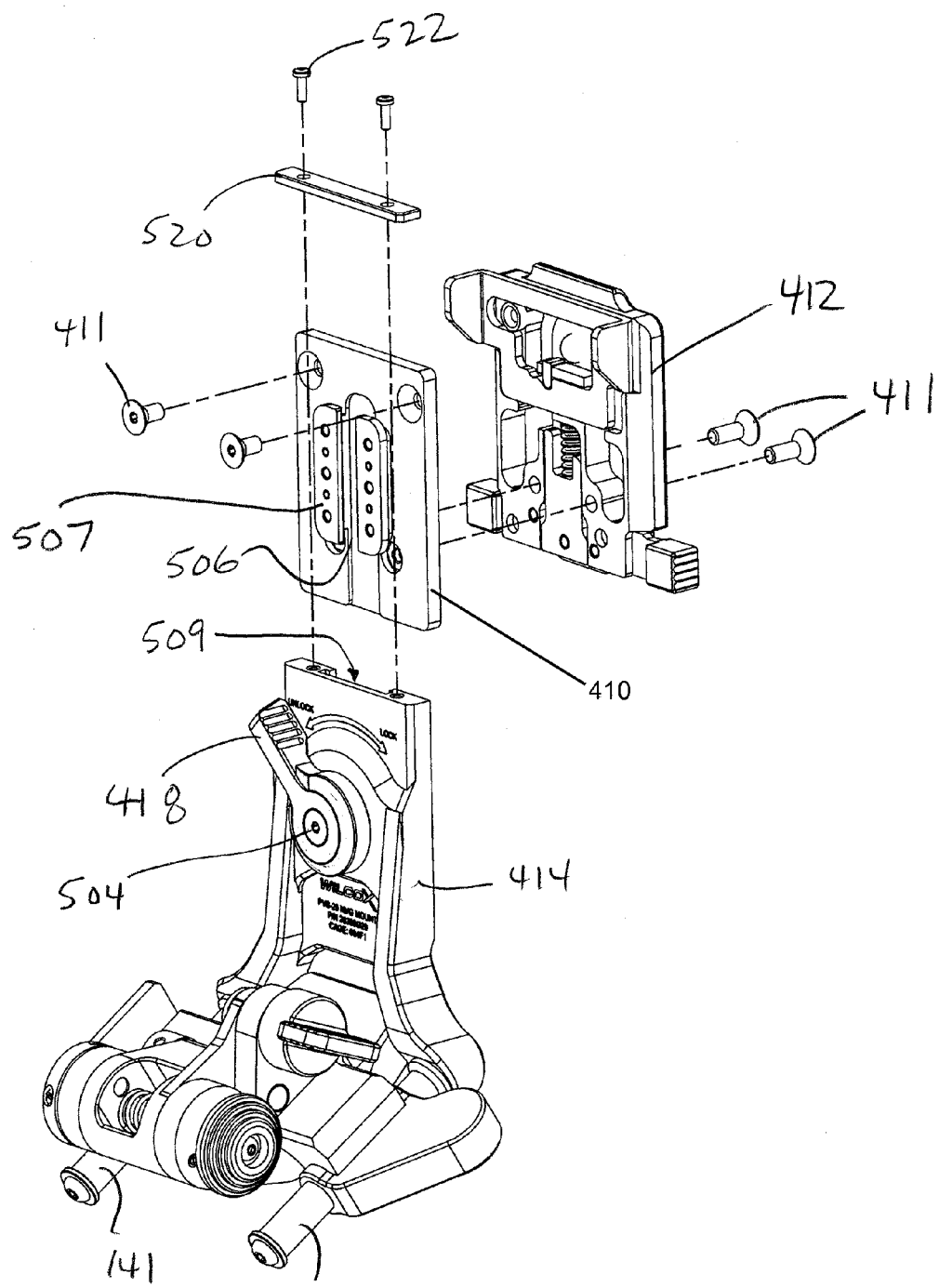
FIG. 9 is a partially exploded view of the helmet interface portion of the helmet mount embodiment appearing in FIG. 7.
Figure 10:
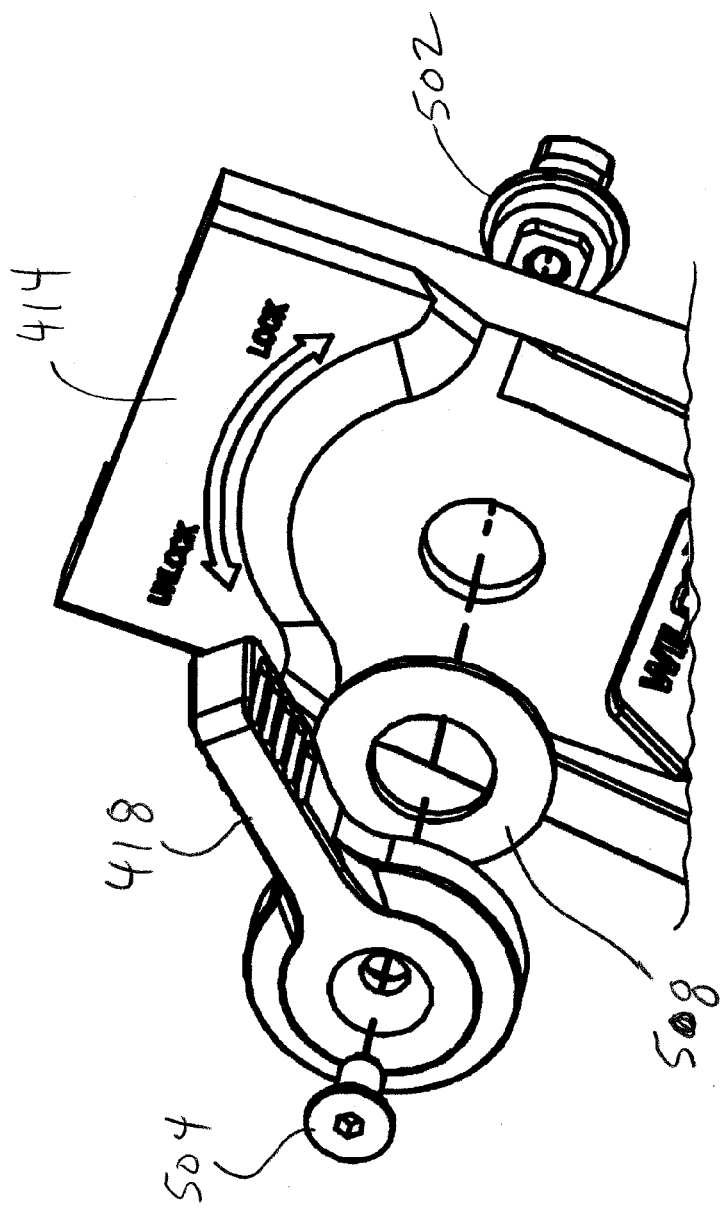
FIG. 10 is an enlarged, fragmentary, and exploded view of the sliding plate member and the vertical adjustment mechanism.

As best seen in FIGS. 9 and 10, a pivoting lever 418 allows the sliding plate 414 to slide with respect to the interface plate 410 to provide a vertical adjustment of an attached optical device relative to the eyes of the user. The lever 418 rotates between a locked position, wherein the sliding plate 414 is fixed relative to the interface plate 410, and an unlocked position, wherein the sliding plate 414 is free to travel up and down vertically relative to the interface plate 410.

The lever 418 is connected to a lock 502 having a T-shaped cross-sectional shape via a threaded fastener 504. The lock 502 engages and disengages from a slot or track 506 when the lever 418 is pivoted between the locked and unlocked positions, respectively. A wave spring 508, preferably a heavy-duty wave spring, is located under the lever 418, which applies enough pressure to keep the sliding plate 414 locked in a fixed vertical position when the lever 418 is in the locked position. The T-shaped lock 502 has ramps on the leading edges so that when the lever 418 is rotated, the ramps engage the T-track 506 first and compress the wave spring 508 as the lever 418 is rotated to the locked position. The ramps disengage from the track 506 when the lever 418 is rotated to the unlocked position. The track 506 is defined by elongate track members 507 which, in turn, ride in a generally T-shaped channel 509 formed in the member 414, the channel 509 being complimentary in size and shape to the track members 507.

A top plate 520 is secured to the sliding plate 414 via threaded fasteners 522 to capture the track 506 within the slot 509 and limit the downward of the sliding plate 414 relative to the interface plate 410. A similar stop may likewise be provided at the lower end of the slot 509 to capture the protrusions 507 within the slot 509 and limit the upward extent of movement of the sliding plate member 414 relative to the interface plate 410.

Figure 11:
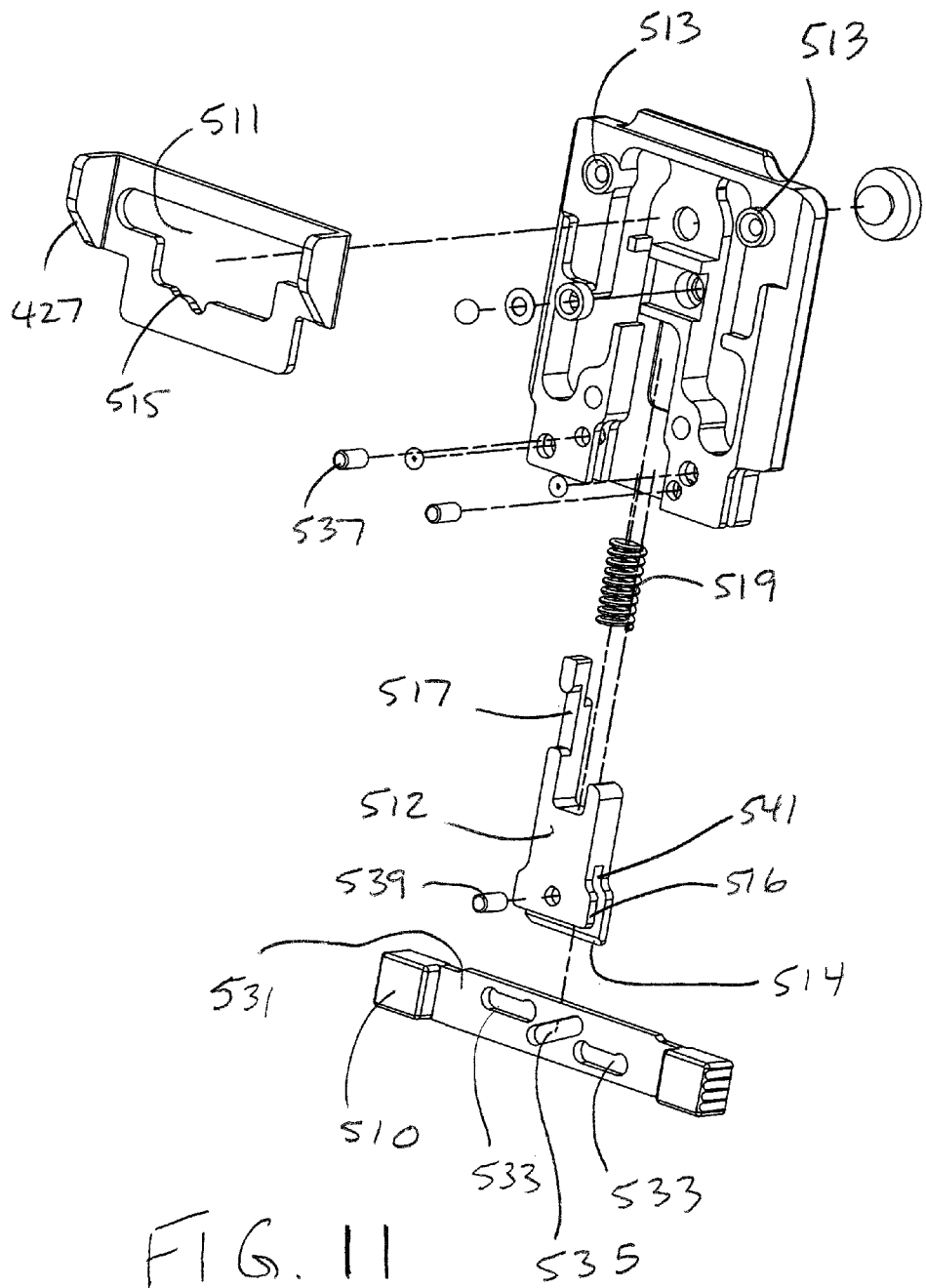
FIG. 11 is an exploded view of the release and breakaway mechanisms of the helmet mount embodiment appearing in FIG. 7.

As best seen in FIG. 11, the mounting apparatus 400 may be secured to the bracket 404 in breakaway fashion. The breakaway feature works by pressing the breakaway button 427 to the right (relative to the user) when the mount is installed on the helmet and the serrated release button 510 is pushed all the way to the right. The breakaway button includes an elongate, transverse opening 511 receiving pins 513. The opening 511 includes a stepped profile 515 engaging a notch 517 in a locking tongue member 412.

By pushing the breakaway button 427 to the right, the stepped profile 515 raises the locking tongue 512 to a "half way" point and holds it there against the urging of a biasing spring 519. By holding it at the half way point, the locking tongue 512 is now positioned so that a small inclined or ramped surface 514 is engaged on the locking lip or edge surface 413 (see FIG. 8) surface of the bracket 404 instead of the flat surface portion 516 of the locking tongue 512 as is the case when the breakaway button 427 is moved to the left. With the ramp 514 engaged on the mating surface 413 of the bracket 404, the mount can be broken away from the helmet by an impact or application of force in the generally upward direction.

The release buttons 510 are adjoined by a slider 531 engaging a slot 541 in the tongue 512. The slider 531 includes first and second elongate openings 533 and an angled elongate slot 535. Pins 537 affixed to the base 412 run in the respective slots 533. Pin 539 in the tongue 512 runs in the angled slot 535 to selectively raise and lower the tongue 512 when the slider 531 is moved side to side. To remove the mount 400 from the helmet 108, the slider is moved to the left, which moves the tongue 512 upward to disengage the tongue 512 from the complimentary depression or receptacle (not shown) on the bracket 404.

Carriage arms 140, 141 extend from corresponding openings in the sliding plate member 414. The remainder of the helmet mound embodiment 400 is otherwise as described above by way of reference to the first exemplary helmet mount embodiment 100, including the carriage arms 140, 141, the transverse carriage member 152, the pivot arm 168, the mounting shoe assembly 270, mounting foot 278, the reinforcement foot 306, the optional magnetic sensor element, and so forth, the descriptions of which set forth above are likewise applicable and incorporated here.

The invention has been described with reference to the preferred embodiments. Modifications and alterations will occur to others upon a reading and understanding of the preceding detailed description. It is intended that the invention be construed as including all such modifications and alterations insofar as they come within the scope of the appended claims and their equivalents.

The invention claimed is:

1. A mounting apparatus for mounting an optical device on a helmet, said mounting apparatus comprising:
    a helmet interface assembly removably attachable to the helmet, said helmet interface assembly for providing a generally vertical sliding adjustment of the mounting apparatus relative to the helmet;
    a pair of arms extending generally horizontally from said helmet interface assembly, each of the arms having a proximal end slidably attached to the helmet interface assembly and a distal end opposite the proximal end;
    a carriage member attached to the distal end of said pair of arms and movable alternately toward and away from the helmet interface assembly by sliding movement of the arms relative to the helmet interface assembly;
    a pivot arm assembly attached in hinged relation to said carriage member, said pivot arm assembly and said carriage member articulated about a generally horizontal pivot axis extending generally transversely relative to a user;
    said pivot arm assembly pivotable between a first, operative position and a second, stowed position, wherein an attached optical device will be positioned before the eyes of a user when the pivot arm assembly is in the first position and out of a line of sight of the user when the pivot arm assembly is in the second position; and
    an optical device mounting member attached to said pivot arm assembly, said optical device mounting member removably attachable to an optical device.

2. The mounting apparatus of claim 1, wherein said helmet interface assembly includes a locking and unlocking lever movable between a first, locked position and a second, unlocked position, wherein the helmet interface assembly is in a locked vertical position when the locking and unlocking lever is in the first position and wherein the helmet interface assembly is slidably movable in a generally vertical direction when the locking and unlocking lever is in the second position to provide a generally vertical adjustment of an attached optical device before the eyes of a user when the pivot arm assembly is in the first, operative position.

3. The mounting apparatus of claim 1, further comprising:
    a bracket attachable to the helmet; and
    said helmet interface assembly attached to said bracket.

4. The mounting apparatus of claim 1, wherein said carriage member is includes a locking and unlocking mechanism for selectively locking said carriage member at a desired position along said pair of arms to provide a generally horizontal fore and aft adjustment of an optical device relative to the eyes of a user when the mounting device is in an operational position.

5. The mounting apparatus of claim 1, further comprising:
    a locking member for securing the pivot arm assembly and the carriage member in fixed relative position; and
    a push button for selectively disengaging said locking member to permit relative rotation between the pivot arm assembly and carriage member.

6. The mounting apparatus of claim 1, further comprising:
    a tilt adjustment mechanism for adjusting a tilt position of an associated optical device relative to an eye of a user.

7. The mounting apparatus of claim 1, further comprising:
    said helmet interface assembly including a breakaway connector for securing the mounting device to the helmet, said breakaway connector configured to release upon application of a predetermined force.

8. The mounting apparatus of claim 7, further comprising:
    said breakaway connector selectively configurable between a breakaway configuration wherein the breakaway connector is configured to release upon application of a predetermined force, and a nonbreakaway configuration wherein the breakaway connector rigidly secures said first pivot arm assembly to the helmet.

9. The mounting apparatus of claim 1, further comprising:

said optical device mounting member including a mounting shoe for removably receiving a complimentary mounting foot of the optical device.

10. The mounting apparatus of claim 9, further comprising:

said mounting shoe adapted to receive a reinforced mounting foot, said reinforced mounting foot including a reinforcing member received within an integral mounting shoe located on the optical device and said complimentary mounting foot rigidly secured to said reinforcing member.

11. The mounting apparatus of claim 1, wherein the optical device is selected from a night vision goggle device, an electronic night vision goggle device, a night vision binocular device, and a night vision monocular device.

12. The mounting apparatus of claim 1, further comprising:

a sensor element positioned on said mounting apparatus so that a sensor on an attached optical device is in proximity with said sensor element when the pivot arm assembly is in the first, operative position and out of proximity with said sensor element when the pivot arm assembly is in the second, stowed position.

13. The mounting apparatus of claim 12, wherein said sensor element is a magnet and the sensor on the attached optical device is a magnetically actuated sensor.

14. The mounting apparatus of claim 13, wherein the magnetically actuated sensor is selected from a reed switch and a Hall Effect sensor.

* * * * *